(12) United States Patent
Jenkins

(10) Patent No.: US 11,731,416 B2
(45) Date of Patent: *Aug. 22, 2023

(54) ASPHALT SHINGLE, ROOF COVERING THEREWITH AND METHOD OF MAKING THE SAME WITH SYNCHRONIZED ADHESIVE POSITIONING THEREON

(71) Applicant: CertainTeed LLC, Malvern, PA (US)

(72) Inventor: Robert L. Jenkins, Honey Brook, PA (US)

(73) Assignee: CertainTeed LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,019

(22) Filed: Aug. 2, 2021

(65) Prior Publication Data

US 2022/0126557 A1 Apr. 28, 2022

Related U.S. Application Data

(60) Continuation of application No. 16/821,554, filed on Mar. 17, 2020, now Pat. No. 11,077,653, which is a
(Continued)

(51) Int. Cl.
| | |
|---|---|
| *B32B 41/00* | (2006.01) |
| *B32B 37/24* | (2006.01) |
| *E04D 1/26* | (2006.01) |
| *B32B 37/12* | (2006.01) |
| *B32B 38/00* | (2006.01) |

(52) U.S. Cl.
CPC .......... *B32B 37/24* (2013.01); *B32B 37/1292* (2013.01); *B32B 38/0004* (2013.01); *B32B 41/00* (2013.01); *E04D 1/26* (2013.01); *B32B 2305/076* (2013.01); *B32B 2305/30* (2013.01); *B32B 2419/06* (2013.01)

(58) Field of Classification Search
CPC ..... B32B 37/24; B32B 37/1292; B32B 41/00; B32B 38/0004; B32B 2419/06; B32B 2305/30; B32B 2305/076; E04D 1/26
USPC ......... 156/64, 259, 260, 269, 271, 279, 350, 156/351, 355, 378, 512, 518
See application file for complete search history.

(56) References Cited

U.S. PATENT DOCUMENTS

| | | |
|---|---|---|
| 2,300,488 A | 11/1942 | Cuno |
| 2,863,405 A | 12/1958 | Leibrook et al. |

(Continued)

OTHER PUBLICATIONS

HammerZone.com Better Living Through Handy man-ly-ness. Re-Roofing Part 3: Installing Asphalt Roof Shingles. 8 pages.
(Continued)

*Primary Examiner* — Michael N Orlando
*Assistant Examiner* — Joshel Rivera
(74) *Attorney, Agent, or Firm* — McDonnell Boehnen Hulbert & Berghoff LLP

(57) ABSTRACT

A method of making the asphalt shingles includes applying a substrate to a layer of shingle-forming material, the substrate having indicators at predetermined spaced-apart distances, with the indicators being sensed as the shingle-forming layer is moved along a predetermined path, with adhesive zones being applied to the shingle such that the application of the adhesive zones is synchronized in response to sensing the locations of the indicators, and with the shingle-forming layer then being cut into individual shingles.

18 Claims, 5 Drawing Sheets

Related U.S. Application Data continuation of application No. 14/551,049, filed on Nov. 23, 2014, now Pat. No. 10,589,503, which is a division of application No. 13/155,736, filed on Jun. 8, 2011, now Pat. No. 8,915,037, which is a continuation-in-part of application No. 12/560,724, filed on Sep. 16, 2009, now Pat. No. 8,365,493.

(56) References Cited

U.S. PATENT DOCUMENTS

| | | | |
|---|---|---|---|
| 2,935,416 | A | 5/1960 | Dunbar |
| 3,050,908 | A | 8/1962 | Schenk |
| 3,234,701 | A | 2/1966 | Burtch |
| 3,247,631 | A | 4/1966 | Lovness |
| 3,434,259 | A | 3/1969 | Corbin |
| 4,404,783 | A | 9/1983 | Freiborg |
| 4,527,374 | A | 7/1985 | Corbin |
| 4,637,191 | A | 1/1987 | Smith |
| 4,824,880 | A | 4/1989 | Algrim et al. |
| 4,856,251 | A | 8/1989 | Buck |
| 4,992,315 | A | 2/1991 | Zickell et al. |
| 5,239,802 | A | 8/1993 | Robinson |
| 5,620,794 | A | 4/1997 | Burkart et al. |
| 5,950,387 | A | 9/1999 | Stahl et al. |
| 6,199,338 | B1 | 3/2001 | Hudson et al. |
| 6,205,734 | B1 | 3/2001 | Kalkanoglu |
| 6,360,506 | B1 | 3/2002 | Graae |
| 6,467,235 | B2 | 10/2002 | Kalkanoglu et al. |
| 6,523,316 | B2 | 2/2003 | Stahl et al. |
| 6,852,185 | B2 | 2/2005 | Sanger |
| 6,874,289 | B2 | 4/2005 | Koch et al. |
| 6,920,730 | B2 | 7/2005 | Becker et al. |
| 6,968,662 | B2 | 11/2005 | Rodrigues |
| 6,990,779 | B2 | 1/2006 | Kiik et al. |
| 7,146,771 | B2 | 12/2006 | Swann |
| 7,204,063 | B2 | 4/2007 | Kandalgaonkar |
| 7,578,108 | B2 | 8/2009 | Swanson |
| 10,589,503 | B2 * | 3/2020 | Jenkins ............... E04D 1/26 |
| 11,077,653 | B2 | 8/2021 | Jenkins |
| 2004/0083674 | A1 | 5/2004 | Kalkanoglu |
| 2004/0107664 | A1 | 6/2004 | Rodrigues |
| 2004/0126103 | A1 | 7/2004 | Swann |
| 2005/0126103 | A1 | 6/2005 | Scheirer et al. |
| 2005/0202216 | A1 | 9/2005 | Rodrigues |
| 2006/0260731 | A1 | 11/2006 | Kalkanoglu |
| 2006/0265989 | A1 | 11/2006 | Geary |
| 2006/0265990 | A1 | 11/2006 | Kalkanoglu et al. |
| 2007/0044410 | A1 | 3/2007 | Kalkanoglu |
| 2007/0068108 | A1 | 3/2007 | Kiik et al. |
| 2007/0068109 | A1 | 3/2007 | Swann |
| 2009/0139175 | A1 | 6/2009 | Todd et al. |
| 2011/0061326 | A1 | 3/2011 | Jenkins |

OTHER PUBLICATIONS

Owens Coming Roofing: Starter Strip Shingle. 1 page.
Applying Roofing shingles. DoItYourself.com 4 pages.
Lowes.com How-To-Library. Applying Asphalt Shingles. Skill Level: Advanced. 4 pages.
Definition of "Continuous" by the Merriam Webster Dictionary, Jan. 27, 2012, http://www.merriam-webster.com/dictionary/continuous.

* cited by examiner

ASPHALT SHINGLE, ROOF COVERING THEREWITH AND METHOD OF MAKING THE SAME WITH SYNCHRONIZED ADHESIVE POSITIONING THEREON

CROSS-REFERENCE TO RELATED APPLICATIONS

This is a division of pending U.S. application Ser. No. 13/155,736, filed Jun. 8, 2011, which is a continuation-in-part of U.S. application Ser. No. 12/560,724 filed Sep. 16, 2009, the complete disclosures of each of which are herein incorporated by reference.

BACKGROUND OF THE INVENTION

Asphalt shingles have been manufactured for many years by impregnating a web of mat, generally of fiberglass material, with a bitumen, such as asphalt, and applying granules of desired color and/or contrast to that surface of the shingle that would be the upper surface of the shingle when the shingle is in an installed condition on a roof. Generally, the shingle is constructed to have multiple tabs separated by slots cut inward of the shingle from the lower edges of the tabs, to leave the tabs spaced-apart relative to each other. Sometimes the granules in the headlap or butt portion of the shingle; i.e., above the tabs, are of a darker, less expensive nature, because generally the headlap portion of the shingle will be covered when shingles are laid up on a roof in courses, with shingles in a next-overlying course covering headlap portions of shingles in a next underlying course, and with each overlying course of shingles being staggered longitudinally (leftward or rightward) relative to the next underlying course of shingles.

It is also known in the shingle/roofing art that it is the tab portions of shingles that are weather-exposed in the installed condition, and thereby it is the tabs of shingles that can be lifted up by wind conditions, and that if such tabs are bent upwardly a sufficient amount, they can crack and, if the wind conditions are severe enough, can be blown off the roof.

Accordingly, it is known to provide wind resistance for tabs of shingles that are installed on a roof. Such resistance is usually effected by application of adhesive beneath the tab portions of shingles, generally at the lower ends of the tabs, so that the lower ends of the tabs are adhesively secured to headlap portions of shingles in a next-underlying course of field shingles of a roof covering.

SUMMARY OF THE INVENTION

The present invention is directed to providing an asphalt shingle having a base mat impregnated with an asphalt material and having a headlap portion and a tab portion, with the tab portion comprising a plurality of tabs separated by slots, and with adhesive applied on the top surface of the shingle in the headlap portion above the upper ends of the slots, but wherein the headlap portion of the shingle has adhesive-free zones above the centers of the tabs.

The invention also includes a roof covering of shingles as described immediately above, wherein the shingles of overlying courses are offset longitudinally (leftwardly or rightwardly) relative to shingles in a next-underlying course, and wherein the adhesive-free zones in headlap portions of shingles are uncovered by shingles in a next-overlying course, such that no adhesive of a shingle of an underlying course is visible through slots of shingles in a next-overlying course.

This invention is also directed to a method of making an asphalt shingle that includes applying a substrate layer to a layer of shingle-forming material, wherein the substrate layer has indicators at predetermined spaced-apart distances, wherein those indicators are sensed as the shingle-forming layer is moved along a predetermined path and then the placement of adhesive zones onto the headlap portion of the upper surface of the shingle forming layer is synchronized in response to the sensing of the locations of the indicators, and wherein the shingle-forming layer is cut into individual shingles.

Accordingly it is an object of this invention to provide a single layer asphalt shingle as described above, or a multilayer shingle with slots that go all the way through the multiple layers.

It is another object of this invention to provide a roof covering as described above.

It is a further object of this invention to provide a method of making an asphalt shingle as described above.

It is a further object of this invention to synchronize the slot cutting step of making the shingle in response to the sensing of the indicators on the substrate layer.

It is another object of this invention that the synchronizing step includes changing the relative placement of the adhesive zones in response to the sensing step.

BRIEF DESCRIPTIONS OF THE DRAWING FIGURES

FIG. 1 is plan view of a shingle in accordance with this invention, showing zones of adhesive present in the headlap portion of the shingle, generally above the slots that separate tabs, and wherein adhesive-free zones are shown in phantom in the headlap portion of the shingle, above the centers of the tabs.

FIG. 2 illustrates an array of two shingles as they would appear if laid up on a roof in courses, with each shingle in a next-overlying course of shingles being longitudinally (leftwardly or rightwardly) offset relative to a shingle in a next-underlying course, such that the adhesive-free zones of shingles in a next-underlying course appear through the slots of shingles in a next-overlying course, such that the adhesive zones of shingles in an underlying course are covered by tabs of shingles in a next-overlying course, and wherein no adhesive in headlap portions of shingles in an underlying course is visible through the slots between tabs of shingles in a next-overlying course.

DETAILED DESCRIPTIONS OF THE PREFERRED EMBODIMENTS

Figure 1:
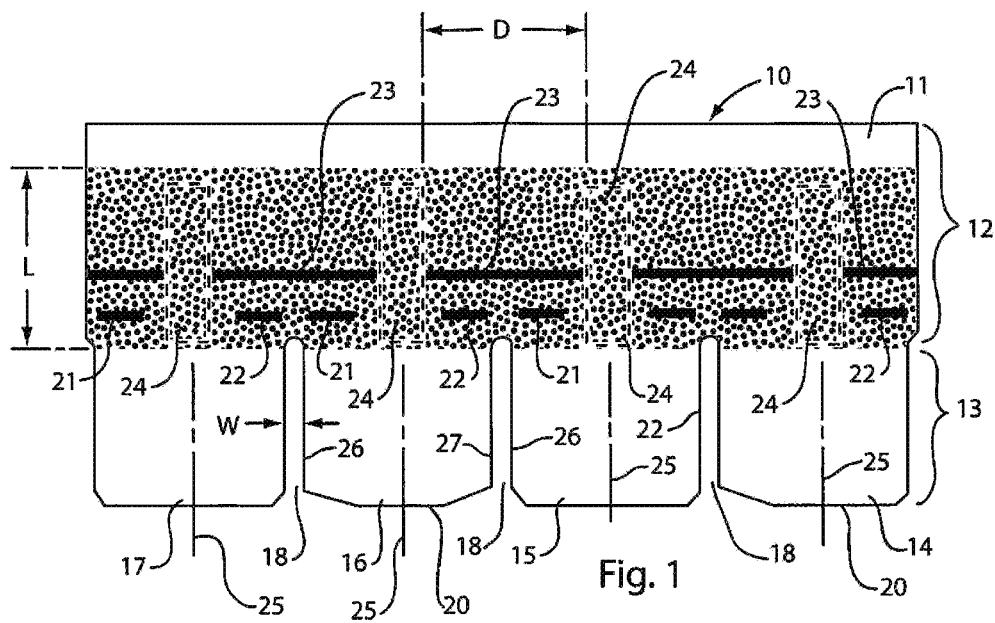

Referring now to the drawings in detail, reference is first made to FIG. 1, wherein the shingle 10 of this invention is illustrated in plan view as being comprised of a single layer of shingle material made of an asphalt impregnated mat with granules applied to its top surface 11. It will be understood that the shingle could alternatively be one of multi-layer construction with slots that go through the multiple layers. The shingle 10 has a headlap portion 12 and a tab portion 13.

In the embodiment shown, the tab portion 13 is a four-tab shingle having tabs 14, 15, 16 and 17 separated by slots 18 that extend from the lower edge 20 of the shingle, at the lower ends of the tabs, up to the headlap portion 12 of the shingle. It will be understood that the shingle could alternatively be a two tab, a three-tab or a shingle with five or more tabs.

It will be understood that the tabs 14-17 may contain decorative granules of different colors and/or contrasts, as may be desired, and that the headlap portion 12 may have dark granules thereon, as shown, or any other type of granules.

It will also be understood that particulate material, such as sand, mica, or other material may be applied to the underside (not shown) of the shingle 10, as desired.

Adhesive stripes 21, 22 and 23 are shown in the headlap portion 12 of the shingle 10, above the upper ends of the slots 18. In the embodiment shown, the stripes 21-23 are shown in two vertically spaced-apart bands, with a pair of stripes 21, 22 placed at the lower end of the headlap portion 12 of the shingle 10, above the slots 18, but just to the left and right of the slots 18, and that the band of stripes 23 is placed somewhat above the lower band of stripes 21, 22, above the upper ends of the slots 18, with the left and right ends of the stripes 23, leaving adhesive-free zones 24 of a width "D" at the lower end of the headlap portion 12 of the shingle 10, between the stripes 21, 22 and between adjacent stripes 23, just above the center lines 25 (shown in phantom), midway between left and right edges 26, 27 of each of the tabs 14-17. These adhesive-free zones 24 are shown in the form of imaginary lines, as are the center lines 25, in order to depict the portions of the headlap portion 12 of the shingle 10 that will not have adhesive applied thereto during the manufacturing process. It will thus be understood that the adhesive-free zones 24 as well as the center lines 25 would not appear to be visible as phantom lines as shown in FIG. 1, but that the same are shown in phantom in FIG. 1, for illustrative purposes only.

Between the adhesive stripes 21 and 22, there is a space that is free of adhesive, directly above each slot 18. This space is particularly adapted to be a fastening zone, for placement of a fastener, such as a nail, for fastening the shingle 10 to a roof, either manually, or by use of a nailing gun, stapling gun or the like.

Figure 2:
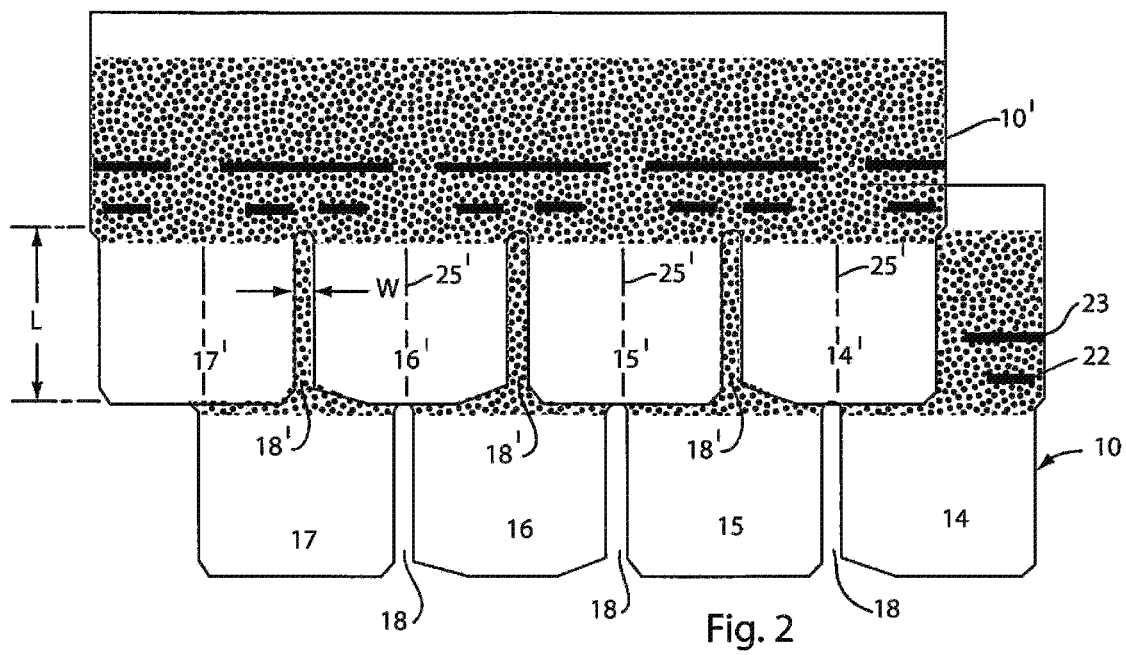

With reference now to FIG. 2, it will be seen that a shingle 10, in accordance with this invention is presented as a shingle in an underlying course of shingles, and that other shingles in that same course would be arranged end-to-end. A shingle 10' is shown as representing a shingle in a next-overlying course of shingles, and it will likewise be understood that a plurality of shingles 10' would be laid up in the next-overlying course, end-to-end.

Also, in FIG. 2, it will be seen that the tabs 14'-17' of the shingle 10' are disposed laterally (longitudinally) offset leftward and/or rightward, such that the imaginary center lines 25' are aligned above the slots 18 that separate tabs 14-17 of shingle 10.

In this manner, the tabs 14'-17' of shingles 10' in an overlying course of shingles will cover the adhesive zones 21-23 of shingles in the next-underlying course, leaving no adhesive zones visible through the slots 18' between adjacent tabs 14'-17' of shingles 10'.

Also, with reference to FIGS. 1 and 2, it will be seen that the adhesive-free zones 24 on the top surface of the headlap portions of the shingles are of at least a length L corresponding to the length of the slots between tabs, and are at least of a width W corresponding to the width of the slots between the tabs, to slightly into the headlap region.

Figure 3:
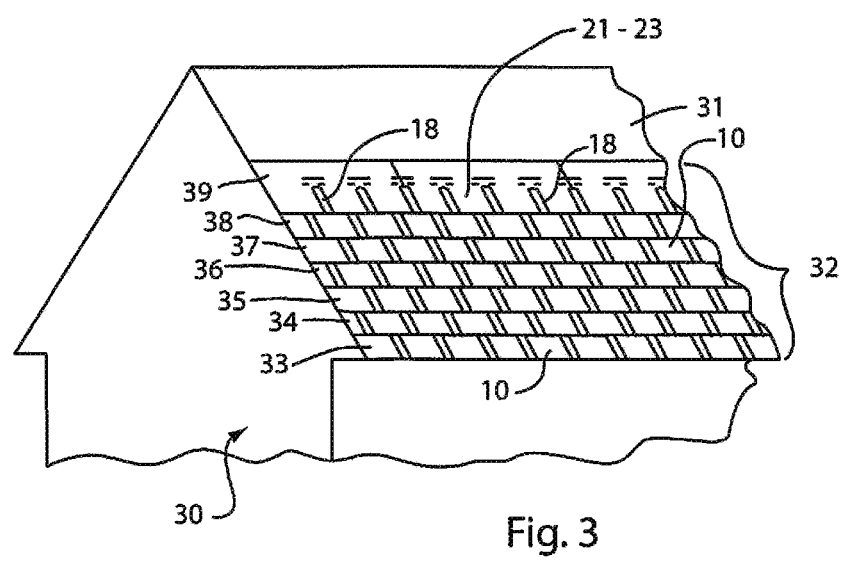
FIG. 3 is an illustration of a partial roof covering of shingles of the type of FIGS. 1 and 2.

In FIG. 3, a building 30 is illustrated, having a roof 31 having a roof covering 32 of shingles in accordance with this invention. In FIG. 3, a plurality of courses 33-39 is illustrated, with alternate courses having their shingles 10 staggered longitudinally (leftwardly or rightwardly) relative to shingles in a next-underlying course, such that slots 18 of shingles 10 in a next-overlying course are centered above tabs of shingles in a next-underlying course and such that adhesive zones 21-23 in headlap portions of shingles in underlying courses are covered by tabs of shingles in next-overlying courses, leaving no adhesive visible through slots that separate tabs of overlying courses.

Figure 4:
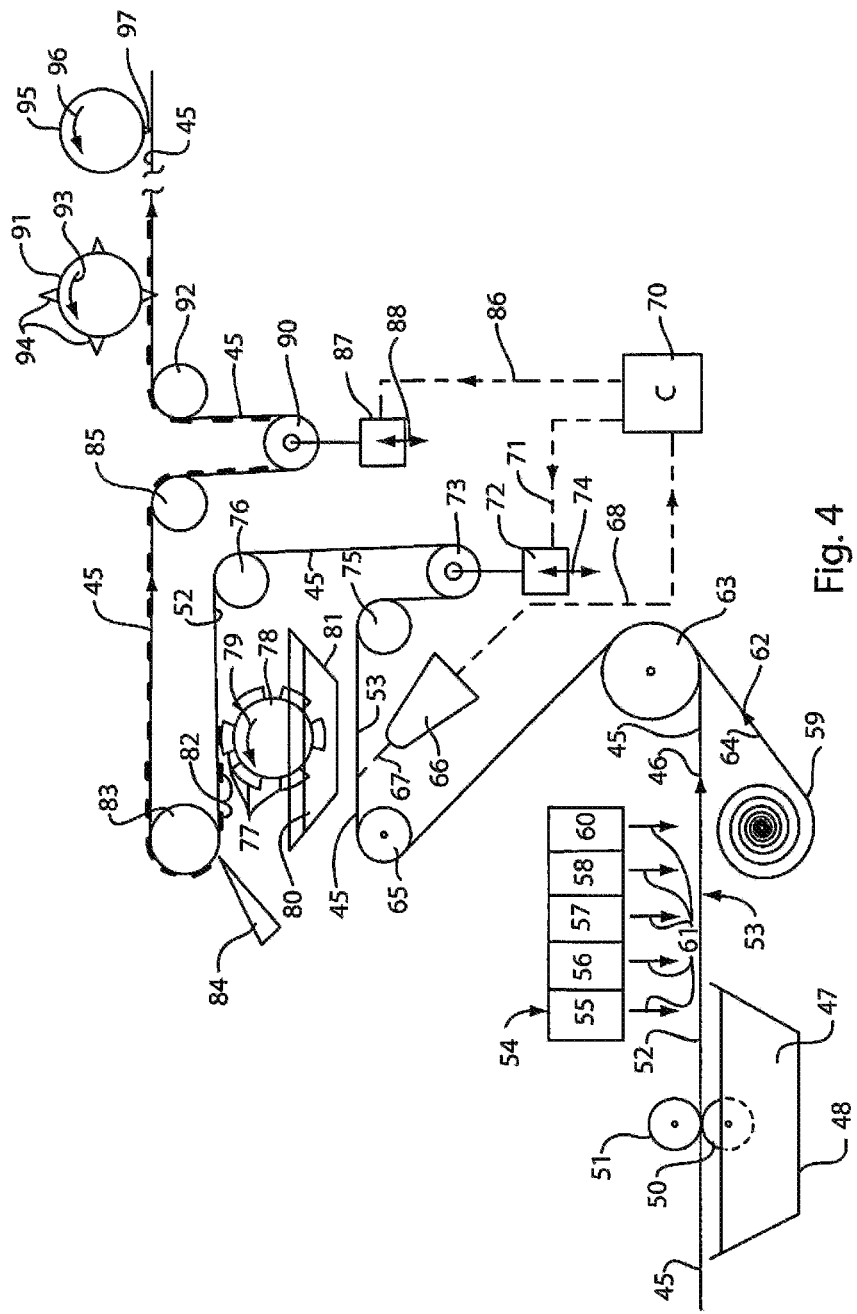
FIG. 4 is a schematic illustration of various steps in the method of making a shingle in accordance with this invention, wherein the relative placement of the adhesive zones and the slots is effected by changing the delivery of the shingle-forming layer to the adhesive applicator and the slot cutter.

With reference now to FIG. 4, it will be seen that a web 45 of base mat is provided, moving along a predetermined path in the direction of the arrow 46, with the web 45 being delivered to a bath 47 of bitumen material, preferably asphalt, in a vessel 48, whereby a roller 50 picks up asphalt and applies it to the mat 45, to be absorbed throughout the mat 45 by being engaged between the lower roller 50 and an upper roller 51, such that asphalt is applied throughout the mat 45, and to its upper surface 52, as well as its lower surface 53.

The thus impregnated mat 45 is then delivered past a granule applicator 54, having a plurality of granule applicator bins 55, 56, 57, 58 and 60 for applying granules to an upper surface 52 of the impregnated mat 45 by dropping them onto the upper surface 52, in the direction of the arrows 61, such that the granules thus applied will adhere to the upper surface 52 of the impregnated mat 45.

Granules of preferably smaller particulate material in the form of sand, mica or the like may be applied to the undersurface 53, if desired, by any of several conventional means known in the art.

It will be understood that, in the manufacture of a shingle-forming layer 45 in accordance with this invention, the layer may be manufactured in the form of a pair of side-by-side shingle-forming layer portions simultaneously, in accordance with that portion of the disclosure of parallel shingle-forming layers as manufactured according to U.S. Pat. No. 6,212,843, the complete disclosure of which is herein incorporated by reference.

As the shingle-forming layer moves along its predetermined path as shown in FIG. 4, a roll of substrate 59 is unrolled, as shown, and applied in the direction of the arrow 62 shown in FIG. 4, to meet with the undersurface 53 of the shingle-forming layer 45, prior to the passage of the substrate layer 59 and shingle-forming layer 45 around the roller 63, and then around the roller 65 as shown. The substrate 59 has adhesive on its surface 64, and is applied to the undersurface 53 of the shingle-forming layer 45, such that it will adhere thereto, and that, after the substrate 59 and shingle-forming layer 45 come together around roller 63, they continue as a unit as shown around the roller 65.

A sensor 66, aimed at the undersurface 53 of the shingle-forming layer 45, senses predetermined, spaced-apart indicators (not shown) on the undersurface of the shingle-forming layer 45 as the shingle-forming layer 45 passes thereover, as shown at 67, and transmits that information via transmission line 68, to a controller 70. The controller 70 may be a programmable logic computer (PLC).

The substrate layer that is provided from roll 59 may be in the form of a tape that provides an indication in the form of a physical mark, a magnetic device, an infrared device, a hole, a photocell, that may be read by the sensor 66. The sensor 66 may take on various forms, such as a lightness or darkness detector, a metal or magnetic detection device, a barcode reader, an infrared detection device, a hole detection device, a photocell, a CCD array image reader or any other form of detection device, many of which are well known in the art and which can detect some difference caused by a mark or indicator of various types passing thereby.

The connection 68 between the sensor 66 and the controller 70 can be in the form of a wired connection, a signal line, or a wireless transmission line providing a signal from the sensor 66 to the controller 70, microprocessor, or computer of any type.

The controller 70, in response to detection information received from the sensor 66 sensing information from an indicator, delivers that information via control line 71 to a drive mechanism 72 for a take-up mechanism 73. The drive mechanism 72 can adjust the take-up roller mechanism 73 upwardly or downwardly as shown by the double headed arrow 74 to adjust the delivery of shingle-forming layer 45, to increase or decrease the delivery of the shingle-forming layer after it passes around roller 75, and prior to its passing around roller 76, in order to synchronize the delivery of shingle-forming layer 45 to adhesive applicators 77 of adhesive applicator roller 78 as it rotates in the direction shown by the arrow 79, to pick up adhesive 80 from adhesive vessel 81 and apply it to the surface 52 of the shingle-forming layer 45, as that surface comes into contact with the adhesive applicators 77.

Adhesive is thus applied in the form of stripes 82 prior to the shingle-forming layer passing around the roller 83.

It will be understood that the adhesive that is applied via the applicators 77, while being described as being in the form of stripes, could be in the form of squares, circles, or any other geometric shape as may be desired, and as will function in accordance with this invention, all of which are embraced within the term "adhesive zones" or "adhesive".

After application of the adhesive 82, and as the shingle-forming layer 45 then passes around the roller 83, a doctor blade 84 may contact the adhesive 82, to even out the thickness of adhesive zones.

After passing around the roller 83, the shingle-forming layer continues in its movement along a predetermined path, to pass around roller 85. The controller 70, via control line 86 may control a drive mechanism 87, to move the same upwardly or downwardly as shown by the double headed arrow 88, so that the drive mechanism may adjust the position of a take-up roller mechanism 90, in response to a signal received via the transmission line 68 from the sensor 66, in order to adjust the placement of the shingle-forming layer 45 relative to a slot-cutting roller 91, after delivery of the shingle-forming layer 45 around roller 92.

The slot-cutting roller 91, rotating in the direction of the arrow 93, as shown, may be provided with one or more cutting blades 94, for cutting the slots between adjacent tabs in the shingle-forming layer.

Thus, the take-up mechanisms 72, 73; 87, 90 may be used to synchronize the placement of adhesive zones on a surface of the shingle-forming layer in response to the sensing of the locations of the indicators, and may additionally adjust the placement of the slots such that they are synchronized in response to the sensor 66 sensing the locations of the indicators. In this regard, the synchronizing step includes changing the relative placement of any of the adhesive zones and the slots in response to sensing the locations of the indicators. This changing of the relative placement of the adhesive zones with or without the sensing of the relative placement of the slots can be effected by changing the delivery of the shingle-forming layer to the adhesive applicator, and, if desired, to the slot cutter as shown in FIG. 4.

Thereafter, the shingle-forming layer 45 may be delivered to any of various mechanisms known in the art, such as a looper, a cooler (not shown), and eventually to a cutting roller 95 rotating in the direction of the arrow 96, as shown, with the cutting roller 95 having at least one cutting blade 97 thereon, for cutting individual shingles to desired lengths.

Figure 5:
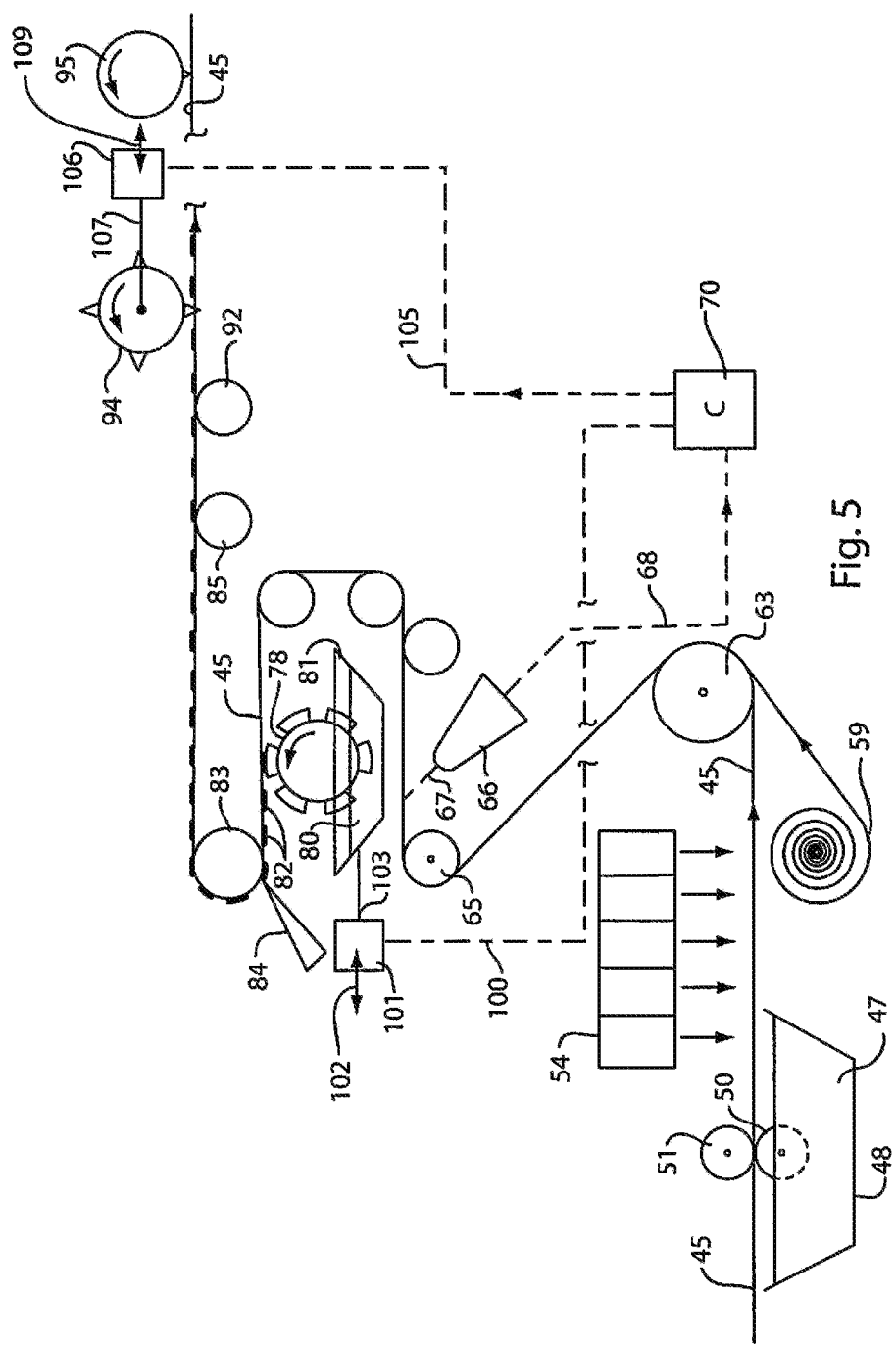
FIG. 5 is an illustration like that of FIG. 4, but wherein the relative placement of the adhesive zones and the slots is effected by changing the position of the adhesive applicator and slot cutter.

With reference now to FIG. 5, an alternative arrangement is schematically illustrated for changing the relative placement of the adhesive zones, and, if desired, also changing the relative placement of the slots in response to the sensing of indicators. In the arrangement illustrated in FIG. 5, to the extent that components are in common with the arrangement of FIG. 4, the same numerals will be used, and, to the extent that there are differences between the embodiments of FIGS. 4 and 5 different numerals will be used, as shown and described.

In the embodiment illustrated in the schematic of FIG. 5, the controller 70, via control line 100 can control the movement of the drive mechanism 101, back or forth as shown by the double headed arrow 102, to effect a change in position of the adhesive applicator 81 relative to the shingle-forming layer 45, as an alternative way of synchronizing the placement of adhesive zones 82 on the shingle-forming layer, by driving the adhesive applicator 81 via drive line 103, as shown. Similarly, the controller 70, via control line 105, can control the movement of the slot cutter 94 through the drive mechanism 106, via drive line 107, for movement of the slot cutter 94 backward or forward as shown by the double-headed arrow 107, for synchronizing the cutting of slots in the shingle-forming layer 45, as an alternative way of changing the relative placement of the slots in response to the sensing of indicators on the shingle-forming layer via the sensor 66.

It will be apparent from the foregoing that various modifications may be made in the details of construction of the shingles, as well as in the methods of manufacture of the shingles of this invention, all within the spirit and scope of the invention as defined in the appended claims.

What is claimed is:

1. A method of making a plurality of shingles, the method comprising:
   delivering along a predetermined path a shingle-forming layer comprising a base mat impregnated with an asphalt material and a layer of particulate material at the top surface of the shingle-forming layer;
   disposing adhesive zones on the shingle-forming layer,
   forming the shingle-forming layer into the plurality of shingles,
   wherein each of the plurality of shingles is
   an asphalt shingle having upper and lower edges spaced apart transversely and right and left edges spaced apart longitudinally, and top and bottom surfaces, the asphalt shingle comprising a base mat impregnated with an asphalt material and a layer of particulate material at the top surface of the asphalt shingle, the asphalt shingle having:
      a headlap portion normally covered and not weather-exposed in an installed condition; and
      a tab portion normally uncovered and weather-exposed in the installed condition, the tab portion comprising a plurality of tabs having longitudinally spaced apart edges on opposite sides and extending from the headlap portion to a lower edge of the asphalt shingle; and a plurality of cutouts of a length L and width W extending from the lower edge of the asphalt shingle to the headlap portion and separating adjacent tabs in spaced-apart relation, the asphalt shingle further comprising adhesive zones and further comprising adhesive-free zones on a top surface of the asphalt shingle in the headlap portion, wherein the adhesive zones are disposed above upper ends of the cutouts, and the adhesive-free zones are disposed above upper ends of the tabs, and are not disposed above upper ends of the cutouts.

2. The method of claim 1, wherein in each of the plurality of shingles, each adhesive-free zone is of at least a transverse length L and of at least a longitudinal width W.

3. The method of claim 1, wherein in each of the plurality of shingles, the adhesive zones are provided in two vertically spaced-apart rows, comprising an upper row and a lower row, wherein each row is comprised of a plurality of spaced-apart zones of adhesive, with adhesive-free zones between the spaced-apart zones of adhesive in each row, each adhesive-free zone being entirely above a tab.

4. The method of claim 1, wherein in each of the plurality of shingles, the adhesive zones are disposed generally horizontal between the right and left edges of the shingle.

5. The method of claim 1, wherein in each of the plurality of shingles, each tab has a central region, wherein the asphalt shingle includes an adhesive-free zone is disposed above the central region of each tab.

6. The method of claim 1, wherein in each of the plurality of shingles, each tab has a centerline, and wherein the asphalt shingle includes an adhesive-free zone in vertical registration with the centerline of each tab.

7. The method of claim 1, wherein in each of the plurality of shingles, the adhesive-free zone is of at least a length L and a width W.

8. The method of claim 1, wherein in each of the plurality of shingles, the cutouts are slots.

9. The method of claim 1, wherein each of the plurality of shingles is a single-layer asphalt shingle.

10. The method according to claim 1, wherein the shingle-forming layer has a plurality of indicators provided at predetermined spaced-apart distances from each other disposed at a surface thereof, and wherein disposing adhesive zones on the shingle-forming layer comprises:

sensing the locations of the indicators; and then actuating the placement of adhesive zones onto a surface of the shingle-forming layer in a headlap portion thereof and synchronizing the placement of the adhesive zones on the surface of the shingle-forming layer in response to the sensing step.

11. The method of claim 10, including the step of forming cutouts in a tab region of the shingle-forming layer to separate the tab region into a plurality of spaced-apart tabs.

12. The method of claim 11, wherein the formation of the cutouts includes synchronizing the placement of the cutouts in the shingle-forming layer in response to the sensing step.

13. The method of claim 11, wherein the synchronizing step includes changing the relative placement of any of:

(a) the adhesive zones; and (b) the cutouts in response to the sensing step.

14. The method of claim 10, wherein the indicators comprise physical marks on the substrate.

15. The method of claim 14, wherein the physical marks comprise holes in the substrate.

16. The method of claim 10, wherein the indicators are sensed by a magnetic detection device, an infrared device, a barcode reader, a metal detection device, a hole detection device, a CCD image reader, or a photocell.

17. The method of claim 10, wherein the plurality of indicators is provided by a tape bearing indicators.

18. The method of claim 10, wherein the plurality of indicators is disposed at a bottom surface of the shingle-forming layer.

* * * * *